United States Patent Office 3,822,284
Patented July 2, 1974

3,822,284
1- AND 3-SUBSTITUTED (3,5-DI-t-BUTYL-4-HYDROXYBENZYL) CARBAZOLE
William F. Werzner, Wood River, Ill., and James R. Miller, Florissant, Mo., assignors to Shell Oil Company
No Drawing. Continuation-in-part of application Ser. No. 55,607, July 16, 1970, now Patent No. 3,673,091. This application June 15, 1972, Ser. No. 263,013
Int. Cl. C07d 27/68
U.S. Cl. 260—315                                4 Claims

ABSTRACT OF THE DISCLOSURE

Novel compounds resulting from the reaction of hindered phenols, such as 3,5-di-t-butyl-4-hydroxybenzyl alcohol, with various aryl amines or carbazole are effective oxidation inhibitors for lubricants.

CROSS REFERENCE TO RELATED APPLICATIONS

This is a continuation-in-part of applicants' copending application Ser. No. 55,607, filed July 16, 1970, now U.S. Pat. 3,673,091.

BACKGROUND OF THE INVENTION

This invention relates to compounds having oxidation inhibition characteristics when added to lubricant compositions. More particularly, it relates to compounds which are prepared from the reaction of 3,5-di-t-butyl-4-hydroxybenzyl alcohol with carbazole.

It is well known that oils and lubricants oxidize during use leading to the formation of organic acids and other deleterious oxygenated products. With the increasing complexity of modern automotive engines and various high speed machinery and their general requirements for improved performance and less frequent maintenance there is a vital need for effective oxidation inhibitors. Consequently, the subject of the present invention is novel compounds which, when incorporated into lubricant compositions, have effective antioxidant qualities.

SUMMARY OF THE INVENTION

It has now been discovered that the reaction products of various aryl amines or carbazole and 3,5-di-t-butyl-4-hydroxybenzyl alcohol possess good oxidation inhibition characteristics when added to compositions of mineral oils and other lubricants.

A broad range of aryl amines are contemplated for use in the present invention. Those considered most suitable are diaryl of secondary aromatic amines, i.e., amines having two aromatic groups attached to the nitrogen atom. However, primary and tertiary aromatic amines are also within the purview of the present invention. Representative of such amines are aniline and triphenylamine. The aryl groups can have one, two or more rings, e.g., they can be phenyl, naphthyl, etc., and can be substituted or unsubstituted. Each aryl group can have from 6 to 30 or more carbon atoms depending upon the nature and degree of substitution although generally they will have from 6 to 18 carbon atoms. Especially suitable are diphenylamine and substituted diphenylamine such as p'-dioctyl-diphenylamine, phenyl-α-naphthylamine, and phenyl-β-naphthylamine. The amine group can also have both alkyl and aryl substituents. Also useful as reactants are materials in which the nitrogen is contained within the ring structure, i.e., heterocyclic amine, such as carbazole, phenazines and acridines. Carbazole, however, is the most advantageous.

Preparation of the antioxidant materials can be carried out in an acetic acid medium using sulfuric acid as a catalyst. The reaction can conveniently take place from 20° to 120° C. or higher. At room temperature, about 25° C., the reaction proceeds slowly requiring about 10 hours for completion; at a temperature of 50° C. the reaction proceeds more rapidly and the reaction period is reduced to about three hours. The reaction can result in alkylation of the rings and/or the nitrogen atoms.

Thus, the alkylation of diphenylamine with 3,5-di-t-butyl-4-hydroxybenzyl alcohol an example of diaryl amine alkylation, produces a mixture of alkylated products in which any or most of the available ortho and para positions of the two aryl groups of the amine are substituted with the 3,5-di-t-butyl-4-hydroxybenzyl group. If equal molar quantities of the amine and the hindered phenolic compound are reacted, the product mixture, although it cannot be completely resolved, consists principally of a mixture of two materials having the structures I and II.

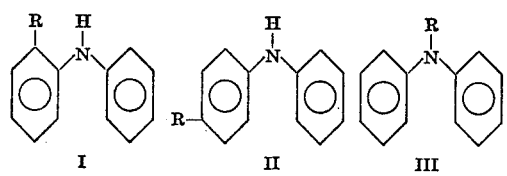

wherein and hereinafter R represents the 3,5-di-t-butyl-4-hydroxybenzyl group. The product, I, substituted in the ortho position, usually predominates. The compound represented by III is also obtained. Small quantities of polyalkylated materials are also formed under these conditions. By increasing the amount of the phenolic compound reacted relative to the amine, the formation of the polyalkylated material is accentuated. Thus compounds having the structures,

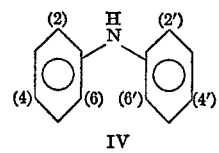

IV wherein R may be substituted at any of the positions numbered, 2,2',4,4',6,6', and wherein R represents the 3,5-di-t-butyl-4-hydroxybenzyl group, are very probably produced when high ratios of the phenolic compound to the amine are used in the synthesis. In addition to the above compounds, analogues of the N-alkylated compound, III, in which ring alkylation has also occurred may also be presented after the reaction. Complete alkylation of all ortho and para positions on both rings may also occur.

Carbazole, representative of an amine in which the nitrogen is contained within the ring structure, i.e., heterocyclic amine, acts similar to the diphenylamine in its reaction with 3,5 - di - t - butyl - 4-hydroxy-benzyl alcohol. Monoalkylation results in the compounds having the following structures (V–VIII),

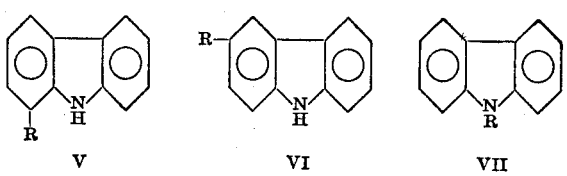

V                VI               VII where R represents the 3,5 - di - t-butyl-4-hydroxybenzyl group. Under some conditions the principal products are V and VI if equal molar quantities of the amine and hindered phenolic compound are reacted. Structure VI usually predominates. Other reaction conditions can produce large yields of VII. In most cases some polyalkylation occurs. In general, when two or more moles of the hindered phenol are reacted with one mole of the amine, the alkylation usually proceeds on more than one ring of the amine. Compounds having the following structures likely are produced:

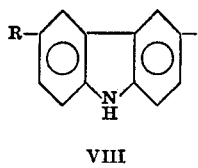 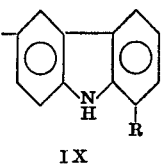 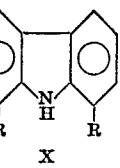
VIII　　　　IX　　　　X wherein R represents the 3,5-di-t-butyl-4-hydroxybenzyl group. However, further alkylation can occur giving tri and tetra ring substitution as well as nitrogen alkylation, having structures XI–XIII.

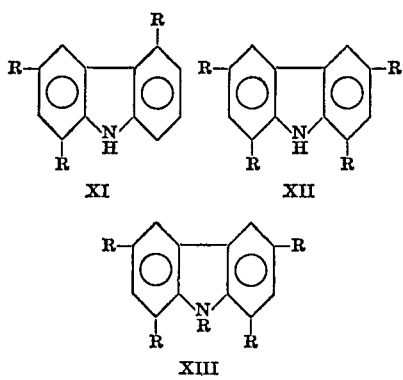

wherein R represents a 3,5-di-t-butyl-4-hydroxybenzyl group.

The alkylated amines of the invention are added to an appropriate oil base in an amount sufficient to inhibit oxidation, usually in a concentration in the range of about 0.01% to 5% w. and preferably from about 0.1% w. to 1% w.

The lubricating oil can be mineral, synthetic, or a blend of mineral and/or synthetic lubricating oils. Mineral lubricating oils can be refined from aromatic, asphaltic, naphthenic, paraffinic or mixed base crudes. The lubricating oils can be distillate or residual lubricating oils, such as for example, bright stock, or blends of the oils to give a finished base stock of desired properties. Synthetic lubricating oils can be polyolefins, e.g., polyisobutene, usually after hydrogenation, or an ester lubrication oil such as pentaerythrityl ester of mixed carboxylic acids having an average chain length, for example, of 5 to 8 carbon atoms.

While synthetic lubricating oils can be used with the invention as stated above, high viscosity index (HVI) mineral oils are preferred, i.e., oils having a viscosity index (VI) of about 80 or higher. Paraffinic base oils are especially exemplary since they characteristically have a high viscosity index, although methods of refinement along with suitable VI improvers can approximate the same objective with other type oils.

The compounds of the present invention can be used in combination or in conjunction with one or more supplementary additives, the amount being appropriate to provide the functional effects desired. Examples are:

1. Antifoam agents, e.g., silicones;
2. Anticorrosion agents, e.g., Group II–A metal salts of petroleum sulfonic acids (such as calcium petroleum sulfonate);
3. Detergents, e.g., Group II–A metal salts of naphthenic acids, e.g., a basic calcium naphthenate, or such salts of alkyl salicylic acids such as a mixture of calcium $C_{14-18}$ alkyl and dialkyl salicylates; or Group II–A metal phenates such as a calcium salt of a condensation product of formaldehyde and octyl phenols;
4. Extreme pressure agents, e.g. organic phosphorous containing compounds such as phosphorothionates as for example triphenylphosphorothionate; phosphates such as tritolylphosphate; salts of chlorinated unsubstituted phosphonic acids with amines; metals dialkyldithiocarbamates such as zinc dialkyldithiocarbamate; metal dialkyldithiophosphate; or chlorinated polyphenyls;
5. Metal passivators and corrosion inhibitors, e.g., triazoles such as methyl -1,2,3-benzotriazole; or dicarboxylic acids such as azelaic or adipic; and
6. Pour point depressants, e.g., polymers of esters of acrylic acid or an alkylacrylic acid.

The above list of additives is neither exhaustive nor restrictive as to the number or kind of additives which can be used with the present invention.

The following examples are only illustrative of the present invention and in no way limit its scope:

EXAMPLE I

The alkylation of carbazole by 3,5-di-t-butyl-4-hydroxybenzyl alcohol was conducted as follows:

To a one-liter flask equipped with a magnetic stirring bar, 300 ml. glacial acetic acid, 0.1 mole (16.7 g.) carbazole and 0.5 ml. concentrated sulfuric acid were added. One tenth mole of 3,5-di-t-butyl-4-hydroxybenzyl alcohol dissolved in 250 ml. glacial acetic acid was added dropwise from a separatory funnel to the carbazole-acetic acid slurry over a 10-hour period (about 1 drop every 10 seconds). The reaction mixture was kept at 30–35° C. and agitation maintained for three hours after addition of the alcohol and then allowed to stand undisturbed for 48 hours. The reaction products included mono- and polyalkylated carbazole.

The mixture was decanted into a separatory funnel containing 200 ml. benzene, subsequently a 50 ml. aqueous solution saturated sodium chloride was added. The organic layer was washed further with 200 ml. saturated sodium chloride solution followed by extractions with aqueous sodium bicarbonate until the washings became neutral or slightly alkaline. To reduce the possibility of forming HCl the mixture may be washed with an aqueous solution of sodium sulfate. The combined aqueous fractions were extracted with 300 ml. benzene, then washed and neutralized with sodium bicarbonate as before. The combined benzene fractions were washed with 200 ml. of water and dried over sodium sulfate. The volume was reduced by evaporation to 150 ml., and 300 ml. of hexane added.

A white residue which formed was separated from the hexane and fractionally crystallized from an ethanol-water solvent system. The white crystals (Product A) were identified as a mixture of the ring monoalkylated carbazole, 1- and 3-(3,5-di-t-butyl-4-hydroxybenzyl)carbazole, the major portion being the 3-substituted isomer, by use of standard analytical methods including infrared and nuclear magnetic resonance spectroscopy as well as thin-layer chromatography and elemental nitrogen analysis. Other forms of alkylated carbazole including N-alkylated forms were contained in the hexane and in the alcohol from which the white crystals were fractionally precipitated. A ring polyalkylated product (Product B) 3,6-bis-(3,5-di-t-butyl-4-hydroxybenzyl) carbazole was obtained from the hexane solution by solvent evaporation.

The reaction products were subjected to a Micro Air Oxidation Test (MAOT) to determine their oxidation inhibition properties. The MAOT was conducted at 300° F., using 20 gram oil samples, an air flow of 4.2 liters per hour, and 20 p.p.m. Fe/Cu catalyst in the form of naphthenates to accelerate oxidation. Table I gives the test results.

TABLE I

Micro air oxidation test results

|   | Hours for 1 millimole $O_2$ uptake per gram of oil |
|---|---|
| (A) Base oil consisting of 50% v. high viscosity index 100 Neutral, 50% v. high viscosity index 250 Neutral, 0.04% w. $C_{22}$ (average) alkylated derivative of succinic acid | 1.4 |
| (B) A+1% w. Product A of Example I | 126 |
| (C) A+1% w. Product B of Example I | 87 |
| (D) A+1% of a 1:2 molar mixture of carbazole and 3,5-di-t-butyl-4-hydroxybenzyl alcohol | 31 |

If carbazole is dissolved in benzene to which an equal volume of glacial acetic acid is added, the reaction products recovered will consist of about 22% N-alkylated carbazole, about 25% ring monoalkylated carbazole and the remainder being a mixture of polyalkylated compounds and starting material.

EXAMPLE II

The alkylation of diphenylamine by 3,5-di-t-butyl-4-hydroxybenzyl alcohol was conducted as follows:

A mixture of 0.1 mole 3,5-di-t-butyl-4-hydroxybenzyl alcohol dissolved in 250 ml. glacial acetic acid was added dropwise, with mild agitation to a mixture of 300 ml. glacial acetic acid, 0.1 mole diphenylamine and 0.5 ml. concentrated sulfuric acid. The reaction, which took about ten hours, was conducted under ambient conditions of temperature and pressure. The principal product, 2,2'-bis (3,5 - di-t-butyl-4-hydroxybenzyl)diphenylamine, was obtained by addition of a light hydrocarbon solvent, followed by water extraction of the acids and evaporation of the solvent. The residue primarily consisted of a mixture of polyalkylated forms of diphenylamine.

EXAMPLE III

The reaction of 3,5-di-t-butyl-4-hydroxybenzyl alcohol and p,p'-dioctyldiphenylamine was conducted in essentially the same manner as the reaction of Example II. The following structure, wherein $n$ is from 1 to 3, is exemplary of the reaction products:

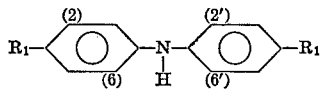

wherein $R_1$ represents an octyl group and the 3,5-di-t-butyl-4-hydroxybenzyl group may be in any position numbered 2,2',6,6' or any combination of these positions including all of them.

EXAMPLE IV

The reaction of phenyl-α-naphthylamine and 3,5-di-t-butyl-4-hydroxybenzyl alcohol was conducted in the same manner and on the same molar basis as the preceding example. The procedure used for the recovery of products was the same as in Example II. The products formed include compounds that may be represented by the following structure:

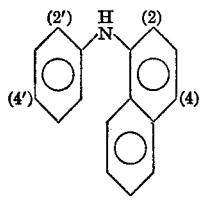

wherein R, the 3,5-di-t-butyl-4-hydroxybenzyl group, may be in any position numbered 2,2',4,4' or any combination of these positions including all of them.

The products of Examples II, III, and IV were evaluated by the MAOT to determine their oxidation inhibition properties. The test conditions were identical to those in Example I. The results are given in Table 2.

TABLE 2

Micro air oxidation test results

|   | Hours for 1 millimole $O_2$ uptake per gram of oil |
|---|---|
| (A) Base oil consisting of 50% v. high viscosity index 100 Neutral, 50% v. high viscosity index 250 Neutral, 0.04% w. $C_{22}$ (average) alkylated derivative of succinic acid | 1.4 |
| (B) A+1% w. reaction product of Example II | 35 |
| (C) A+1% w. reaction product of Example III | 10 |
| (D) A+1% w. reaction product of Example IV | 31 |

The test results disclosed in Table 2 show that the novel compounds of this invention possess oxidation inhibition properties. The carbazole reaction products, as shown in Table 1, possess these qualities to a high degree.

We claim as our invention:

1. 3,5-di-t-butyl-4-hydroxybenzyl-substituted carbazole having the ring structure

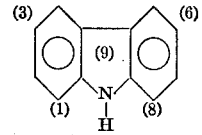

wherein the 3,5-di-tert-butyl-4-hydroxybenzyl substituent is in the position selected from the group consisting of 1, 3, and a mixture of 1 and 3.

2. The compound of claim 1 in which said substituent is in the 1 position and the compound is 1-(3,5-di-t-butyl-4-hyroxybenzyl) carbazole.

3. The compound of claim 1 in which said substituent is in a mixture of the 1 and the 3 positions and the compound is a mixture of 1- and 3-(3,5-di-t-butyl-4-hydroxybenzyl) carbazole.

4. The compound of claim 1 in which said substituent is in the 3 position and the compound is 3-(3,5-di-t-butyl-4-hydroxybenzyl) carbazole.

References Cited

UNITED STATES PATENTS

| 2,140,545 | 12/1938 | Pier et al. | 260—315 |
| 3,305,483 | 2/1967 | Coffield | 252—51.5 R |

FOREIGN PATENTS

| 1,018,301 | 1/1966 | Great Britain | 260—315 |

HENRY R. JILES, Primary Examiner

S. D. WINTERS, Assistant Examiner

U.S. Cl. X.R.

260—571